(12) United States Patent
Tourancheau et al.

(10) Patent No.: US 7,561,584 B1
(45) Date of Patent: Jul. 14, 2009

(54) IMPLEMENTATION OF A GRAPH PROPERTY IN A SWITCHING FABRIC FOR FAST NETWORKING

(75) Inventors: Bernard Tourancheau, Miribel (FR); Henri Gouraud, Hyères (FR); Danny Cohen, Santa Monica, CA (US); Ivan Sutherland, Santa Monica, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 562 days.

(21) Appl. No.: 11/270,010

(22) Filed: Nov. 9, 2005

(51) Int. Cl.
*H04L 12/28* (2006.01)
*G06F 15/173* (2006.01)

(52) U.S. Cl. .................... 370/400; 709/223
(58) Field of Classification Search .......... 370/401, 370/470, 400; 709/223–226
See application file for complete search history.

(56) References Cited

U.S. PATENT DOCUMENTS

2007/0003055 A1* 1/2007 Bark et al. .................. 379/413

FOREIGN PATENT DOCUMENTS

WO    WO 2005026964 A2 *   3/2005

* cited by examiner

*Primary Examiner*—Gregory B Sefcheck
*Assistant Examiner*—Nima Mahmoudzadeh
(74) *Attorney, Agent, or Firm*—Osha • Liang LLP (57) ABSTRACT

A system, including at least one central processing unit, at least one memory unit, and a plurality of integrated circuits that form a switching fabric configured to propagate data packets between the at least one central processing unit and the at least one memory unit, wherein the switching fabric is constructed using at least two directed acyclic graph (DAG) networks.

15 Claims, 10 Drawing Sheets

FIGURE 1

|  |  |  |  |
|---|---|---|---|
| IC 112 | IC 114 | IC 116 | IC 118 |
| IC 120 | IC 122 | IC 124 | IC 125 |
| IC 126 | IC 128 | IC 130 | IC 132 |
| IC 134 | IC 136 | IC 138 | IC 140 |
| IC 142 | IC 144 | IC 146 | IC 148 |

Never-this-Direction
DAG
500

Never-this-Direction
DAG
502

Never-this-Direction
DAG
504

Never-this-Direction
DAG
506

IMPLEMENTATION OF A GRAPH PROPERTY IN A SWITCHING FABRIC FOR FAST NETWORKING

BACKGROUND

A switching fabric is a network of interconnected integrated circuits that operate to switch (i.e., route) data packets from input ports to output ports in a single network system. Typically, switching fabrics switch data packets between central processing units (CPUs), memory units, and input/output (I/O) units of single network systems.

Typically, data is source routed within the switching fabric using an encoding scheme that allows the switches to determine which way to route data. In a classically organized 2D matrix switching fabric with all switches available for messages to be transmitted, all turns are possible from any one location in the switching fabric. That is, data can be routed in any direction from each switching point in the switching fabric. When more than one packet arrives concurrently at a switch, the switching fabric arbitrates between traffic destined for the same output port. Typically, resources (i.e., switches in the switching fabric, links between switches, buffers along the lines, etc.) are occupied by data packets in a wormhole fashion (i.e., a packet travels in successive pieces and thus may occupy several resources)

In some cases, data packets routed in such a 2D switching fabric may deadlock. For example, two (or more) messages may mutually block each other if they block the progression of each other simultaneously. Deadlock may also occur if messages double back on themselves (i.e., get stuck in an infinite waiting loop). Typically, provisions against deadlocking in switching fabrics involve the use of buffers, and/or control logic or software to delay or regulate or constrain the route that data takes from a particular source to a particular destination. For example, buffers in the switching fabric can be used to cache particular data routing patterns temporarily so that packets being routed through the same switching point do not block each other.

SUMMARY

In general, in one aspect, the invention relates to a system, including at least one central processing unit, at least one memory unit, and a plurality of integrated circuits that form a switching fabric configured to propagate data packets between the at least one central processing unit and the at least one memory unit, wherein the switching fabric is constructed using at least two directed acyclic graph (DAG) networks.

In general, in one aspect, the invention relates to a method for constructing a switching fabric, comprising obtaining at least two sub-graphs comprising a deadlock-free property in an existing switching fabric, wherein the at least two sub-graphs are directed acyclic graphs (DAGs), combining the at least two sub-graphs to obtain an initially connected switching fabric, adding a multiplexer to each input of the initially connected switching fabric, wherein the multiplexer allows the selection of one of the at least two sub-graphs, adding a demultiplexer to each output of the initially connected switching fabric to obtain a fully-connected switching fabric, wherein the demultiplexer allows the selection of one of the at least two sub-graphs, wherein the fully-connected switching fabric comprises the deadlock-free property.

In general, in one aspect, the invention relates to a computer readable medium for constructing a switching fabric comprising software instructions to obtain at least two sub-graphs comprising a deadlock-free property in an existing switching fabric, wherein the at least two sub-graphs are directed acyclic graphs (DAGs), combine the at least two sub-graphs to obtain an initially connected switching fabric, add a multiplexer to each input of the initially connected switching fabric, wherein the multiplexer allows the selection of one of the at least two sub-graphs, and add a demultiplexer to each output of the initially connected switching fabric to obtain a fully-connected switching fabric, wherein the demultiplexer allows the selection of one of the at least two sub-graphs, and wherein the fully-connected switching fabric comprises the deadlock-free property.

Other aspects of the invention will be apparent from the following description and the appended claims.

DETAILED DESCRIPTION

Exemplary embodiments of the invention will be described with reference to the accompanying drawings. Like elements in the various figures are denoted by like reference numerals for consistency. Further, the use of "ST" in the figures corresponds to the use of "Step" in the detailed description below.

In the following detailed description of the invention, numerous specific details are set forth in order to provide a more thorough understanding of the invention. In other instances, well-known features have not been described in detail to unnecessarily confuse the description.

In general, embodiments of the invention relate to designing switching fabrics with restricted routing such that an inherent property of the switching fabric is ensured. Specifically, embodiments of the invention relate to designing a deadlock-free switching fabric using graph theory to ensure that the switching fabric is inherently deadlock-free. More specifically, embodiments of the invention relate to designing a deadlock free switching fabric using directed acyclic graphs (DAGs).

Figure 1:
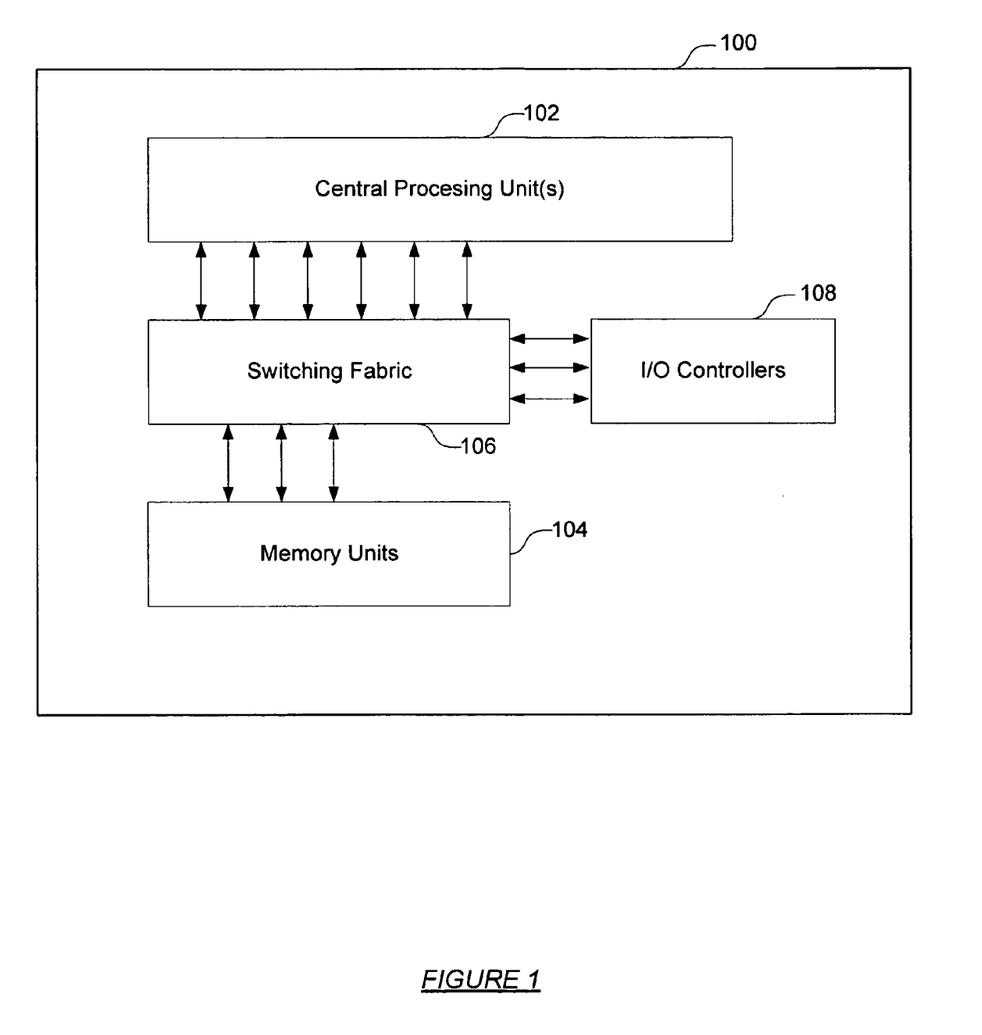
FIG. 1 shows a system in accordance with an embodiment of the present invention.

FIG. 1 shows a system in accordance with one embodiment of the invention. Specifically, FIG. 1 shows the system divided into a plurality of computing modules (i.e., module (100)). A module (100) includes one or more central processing units (CPUs) (102), one or more memory units (104) (e.g., cache memory, memory controllers), I/O Controllers (108) for communicating with devices outside of the module, and a switching "fabric" (106) for switching data packets between, among other things, (i) the CPUs (102) and the memory units (104) and (ii) between module (100) and another module (not shown). The CPUs (102), memory units (104), and I/O Controllers (108) are all connected to the switching fabric (106) in the same manner so that each component can exchange data and communicate through the switching fabric (106).

A switching fabric, like that shown in FIG. 1, may be formed of a plurality of individual integrated circuits (ICs). In order to simplify the design of such a switching fabric, embodiments of the present invention relate to a technique for designing one or more integrated circuits for a switching fabric, where the switching capabilities in the integrated circuits include an inherent deadlock-free property that prevents data from deadlocking when being routed through the switching fabric. Those skilled in the art will appreciate that any device (e.g., storage disks, long distance memory access, etc.) or network (e.g., IP network, wireless network, etc.) may be connected to any of the elements shown in FIG. 1. For example, a storage disk may be connected to the memory units. Further, those skilled in the art will appreciate that devices or units may also be connected on any edge of the switching fabric (106) (described below in FIG. 3), and not only to the periphery of the switching fabric (106).

Figure 2:
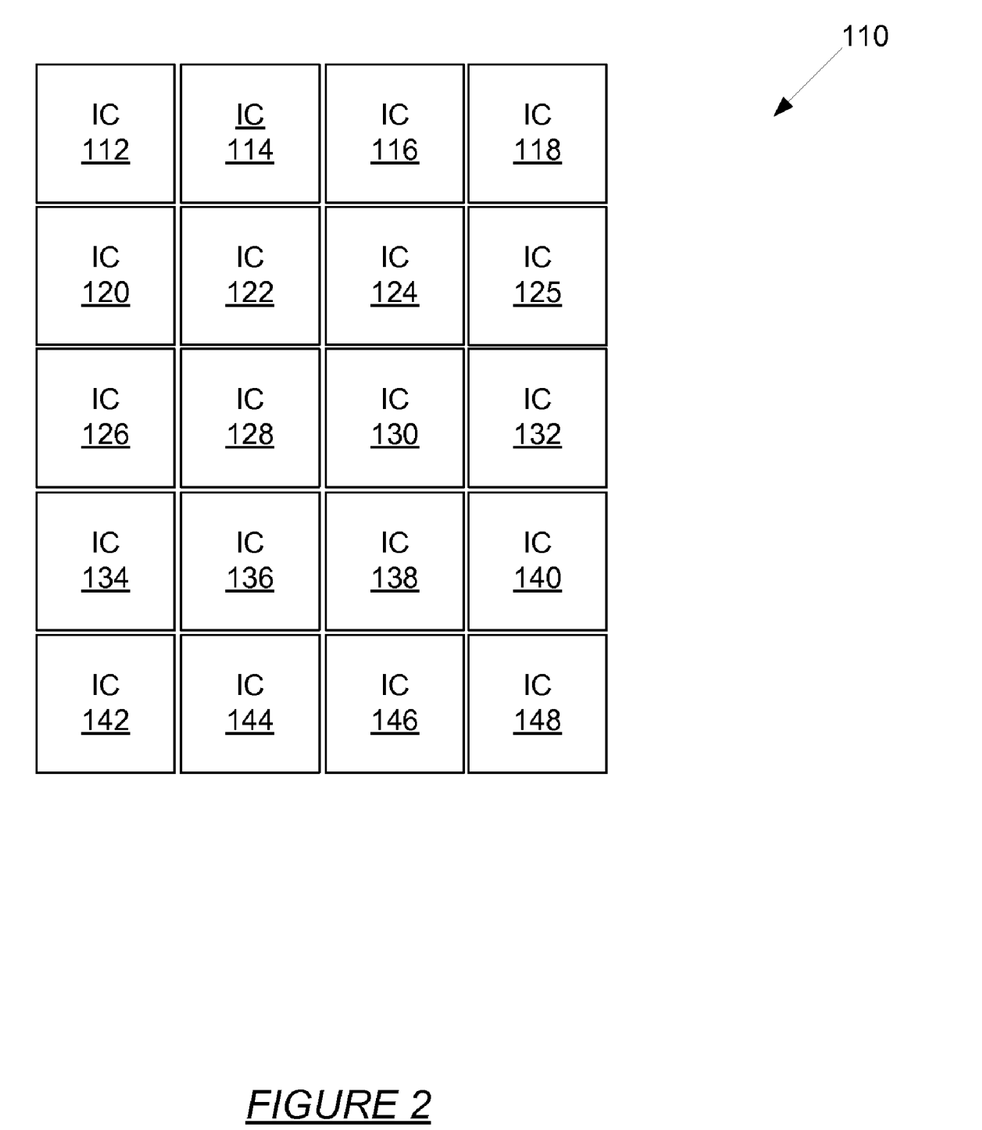
FIG. 2 shows integrated circuits that form a switching fabric in accordance with an embodiment of the present invention.

FIG. 2 shows a switching fabric (110) in accordance with an embodiment of the invention. The switching fabric (110) of FIG. 2 is formed of individual integrated circuits (ICs) (e.g., 112, 114, 116, 118, 120, 122, 124, 125, 126, 128, 130, 132, 134, 136, 138, 140, 142, 144, 146, 148). Further, in one embodiment of the invention, the integrated circuits (e.g., 112, 114, 116, 118, 120, 122, 124, 125, 126, 128, 130, 132, 134, 136, 138, 140, 142, 144, 146, 148) include regions configured for "proximity communication." Proximity communication is based on the observation that fast, low-cost communication is possible over short distances. Integrated circuits that are positioned for proximity communication are arranged such that transmitting and receiving circuits in the integrated circuits are aligned with only microns of distance between them (i.e., interconnecting ICs via proximity communication requires the inputs and outputs of the ICs to be aligned). In one embodiment of the invention, switches are implemented on the ICs (e.g., 112, 114, 116, 118, 120, 122, 124, 125, 126, 128, 130, 132, 134, 136, 138, 140, 142, 144, 146, 148) in a manner that allows the ICs to be interconnected via proximity communication (or some other media) when the ICs are physically close enough. In one embodiment of the invention, the alignment of the inputs and outputs of the interconnected ICs is obtained using symmetrical 2-dimensional DAGs (discussed below). A group of ICs interconnected in such a manner forms a module (such as module (100) shown in FIG. 1).

Those skilled in the art will appreciate that although one embodiment of the invention uses proximity communication between the integrated circuits of a switching fabric, there may be several other methods for communication between integrated circuits in a switching fabric. For example, integrated circuits may be connected via an electrical bus using fast, high density, low energy communication wires. Further, those skilled in the art will appreciate that there may be any type of overlapping in the layout of the individual integrated circuits. For example, the integrated circuits may overlap in each of the four corners.

As noted above, the present invention relates to constructing switching fabrics with an inherent deadlock-free property. Conceptually, constructing a switching fabric using embodiments of the present invention may be thought of as breaking up network communication lines of a certain physical width into many narrower, parallel lines that restrict the directions that data is permitted to be routed from a particular source to one or more destinations. Said another way, space division multiplexing is applied to a switching fabric (i.e., to the ICs in a switching fabric) that allows data to travel in all directions from all points of the switching fabric such that the switching fabric is divided into smaller, limited directional switching fabrics that work together to route data from source to destination. For example, a bidirectional line may be divided into two directed lines. Alternatively, a bidirectional network of width w, where all the lines switch data in all directions at each switching point, may be divided into smaller networks of width w/8, where each network is built around unidirectional lines that include restricted switching possibilities at each switching point.

In one embodiment of the invention, a switching fabric with an inherent deadlock-free property is constructed using a collection of directed acyclic graphs (DAGs). A DAG is a directed graph that contains no possibility of cycles. That is, a DAG cannot be traced such that data leaves source A (where a source may be a vertex or an edge on the DAG) and subsequently comes back to source A by forming a cycle. More specifically, in one embodiment of the invention, each integrated circuit shown in FIG. 2 may be mapped onto a separate independent DAG network (discussed below). Those skilled in the art will appreciate that the DAG network associated with each IC in the system may be symmetrical. In this case, the switching fabric constructed from DAG networks associated with one IC may be duplicated for other interconnected ICs to obtain the switching fabric for an entire system/device.

Specifically, embodiments of the invention use a collection of quadrant DAGs and/or never-this-direction DAGs to construct switching fabrics. Quadrant DAGs are DAGs that allow switching only in two successive directions. Said another way, quadrant DAGs follow the north-east, north-west, south-east, or south-west quadrants. Notice that several turns are not possible in each of these DAGs because data is forbidden to travel in two directions. Alternatively, in one embodiment of the invention, never-this-direction DAGs, where turns in all but one direction are possible, may be used to construct switching fabrics. A collection of (quadrant or never-this-direction) DAGs is several (quadrant or never-this-direction) DAGs representing the network for each chip or integrated circuit of the system put together to build a switching fabric for the entire system.

Figure 3:
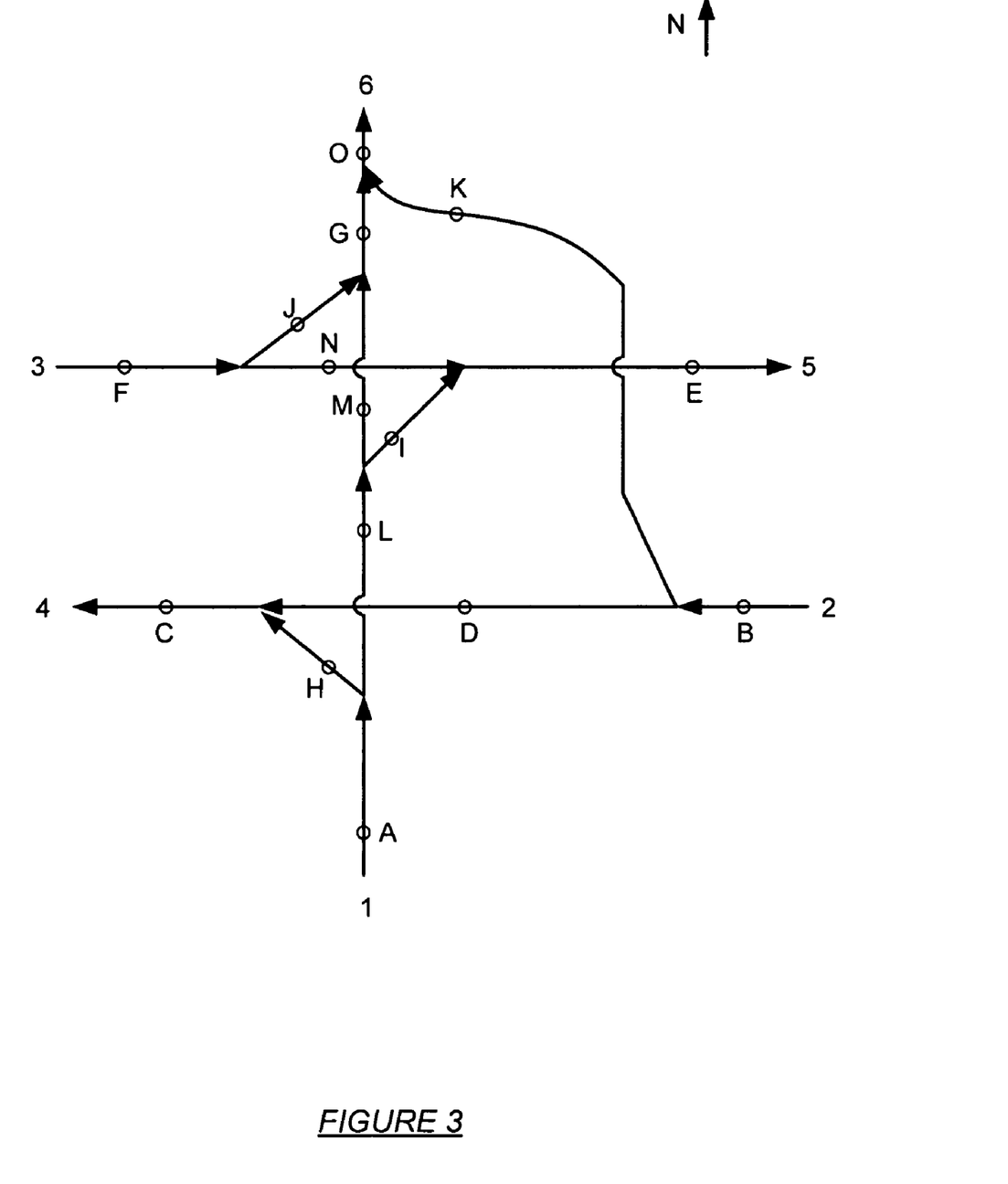
FIG. 3 shows a not-south never-this-direction DAG in accordance with one, embodiment of the invention.

FIG. 3 shows an example of a never-this-direction DAG in accordance with one embodiment of the invention. Never-this-direction DAGs follow a not-south, a not-north, a not-east, or a not-west policy. In this manner, U-turns within the switching fabric are not possible. Specifically, the graph shown in FIG. 3 employs a not-south policy, as indicated by the lack of an arrow in the south direction in the graph. Thus, north, east, and west turns are possible, but because data is not permitted to travel in the south direction, it can easily be seen that data cannot loop back upon itself. The allowed turns in the DAG shown in FIG. 3 always "progress" towards the north direction, such that the turns allowed are east-north, west-north, north-east, and north-west. For example, data coming in from entrance 1 can either turn towards the west and exit at 4, or turn towards the east and exist at 5. Alternatively, data coming in from entrance 1 can be routed straight through the chip without making any turns, in which case the data would exit at 6. Further, the not-south DAG shown in FIG. 3 does not allow east-west-east or west-east-west turns, thereby preventing data from U-turning back to the original source.

Further, in FIG. 3, each edge (i.e., A, B, C, D, E, F, G, H, I, J, K) of the never-this-direction DAG is represented by an open circle. An edge is defined as a portion of the data path between entry points (e.g., A, B, F), exit points (e.g., C, E, G), and portions of the graph that allow data to change directions (i.e., turn) (H, I, J, K). Those skilled in the art will appreciate that the edges shown in FIG. 3 are used to determine a dependency graph associated with the never-this-direction DAG (discussed below in FIG. 4). Further, those skilled in the art will appreciate that all edges may be used to determine a dependency graph associated with a DAG, depending on how complicated the DAG network may be. As noted above, devices and/or units may be connected to any edge of a switching fabric network. For example, in FIG. 3, a device may be connected to edge A, B, C, etc.

In one embodiment of the invention, a switching fabric is constructed by mapping a portion of the switching fabric onto a DAG network, such as the never-this-direction DAG network shown in FIG. 3. Those skilled in the art will appreciate that a portion of a switching fabric may also be mapped onto a quadrant DAG network. In one embodiment of the invention, a combination of independent DAGs are used to design a switching fabric for a system. More particularly, each integrated circuit in a device or system may be mapped onto a DAG network. The DAG networks for each integrated circuit may then be combined to obtain a deadlock-free switching fabric for the entire system or for one or more devices in the system (discussed below in FIGS. 5A and 5B). A combination of independent DAGs provides the same connectivity/switching capacity as the original graph, in addition to providing the useful property of avoiding deadlocks, with only the cost of an initial multiplexing step to switch onto a DAG of a switching fabric that is able to route data to the intended destination. When switching fabrics are designed using a collection of DAG networks, deadlocks are inherently not possible because, as can be easily shown, the graph formed by tracing the dependencies of the DAG network (described below) is also a DAG. Those skilled in the art will appreciate that a well-known property of graph theory states that if the dependency graph of a DAG is also a DAG, then inherently, no cycles exist in the dependency graph and thus, no cycle can occur and thus no deadlock.

Those skilled in the art will appreciate that using graph theory to design and construct switching fabrics is well known in the art. Specifically, checking if a portion of a switching fabric is a DAG network using graph theory is well known in the art. Further, those skilled in the art will appreciate that although the previous discussion focused on constructing switching fabrics using quadrant DAGs or never-this-direction DAGs, any other DAG collection may be used to construct a deadlock-free switching fabric because a DAG by definition does not permit deadlocks. In addition, those skilled in the art will appreciate that although the present invention focuses on constructing a switching fabric with an inherent deadlock-free property, the present invention may also be used to apply graph theory to design switching fabrics with other inherent properties for fast network, such as edge or vertex load balancing, reducing the diameter, path redundancy, etc.

Those skilled in the art will appreciate that the components shown in FIG. 1 (i.e., CPUs, memory units, I/O units) may be connected to any edge shown in FIG. 3, as long as the connection of such units does not introduced any cyclic dependencies in the dependency graph of FIG. 4 (described below).

Figure 4:
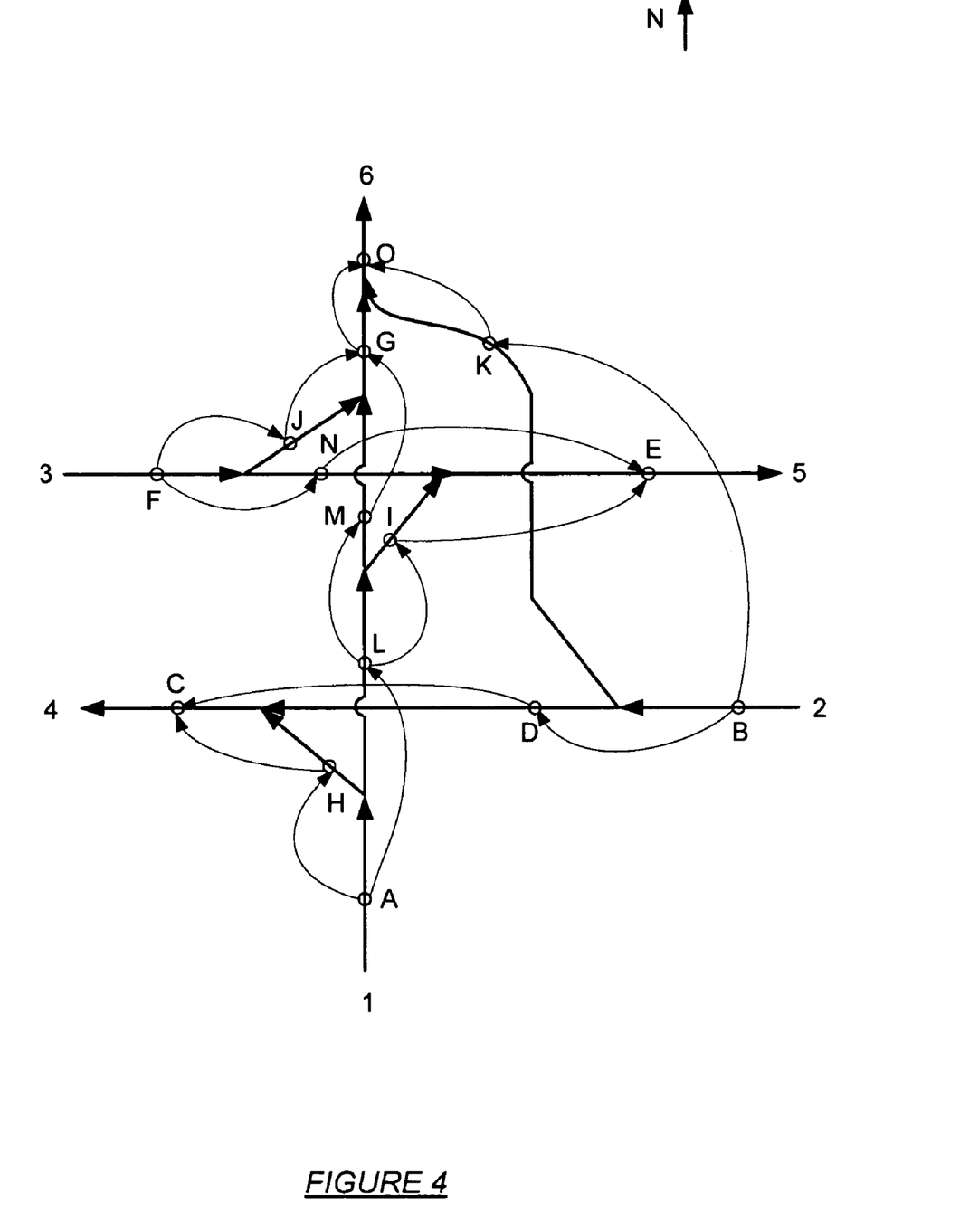
FIG. 4 shows a dependency graph for a never-this-direction DAG in accordance with an embodiment of the present invention.

FIG. 4 shows a dependency directed graph corresponding to the never-this-direction DAG shown in FIG. 3 in accordance with one embodiment of the invention. Specifically, each edge (i.e., A, B, C, D, E, F, G, H, I, J, K) of FIG. 3 is replicated in FIG. 4, and the dependency graph is formed by connecting the edges (i.e., the open circles representing the edges) between which data is permitted to travel. For example, data entering edge A (northbound) can be routed to edge H (in order to reach edge C in an westbound direction) or may be routed directly vertically (north) and exit via edge G. Thus, edge A is directly connected to edges H and G, and edge H is connected to edge C. Further, data entering edge B may continue west to edge C or turn in a northbound direction toward edge K.

Those skilled in the art will appreciate that aforementioned process continues until all the edges in a DAG network are connected based on the direction that data is permitted to travel, forming the completed dependency graph of FIG. 4. In addition, the dependency graph of a DAG is also a DAG, and thus, the deadlock-free property is implied directly for the dependency graph of a DAG. Those skilled in the art will also appreciate that because the switching network associated with an IC is initially mapped onto a DAG network, the resulting dependency graph formed by the process described above is inherently acyclic. This, in turn, means that the switching fabric constructed using such a DAG network is inherently free of deadlocks. Furthermore, those skilled in the art will appreciate that if a switching network for a particular IC is mapped onto a quadrant DAG, then the process described in FIGS. 3 and 4 may be used to construct a dependency graph associated with the quadrant DAG.

Figure 5A:
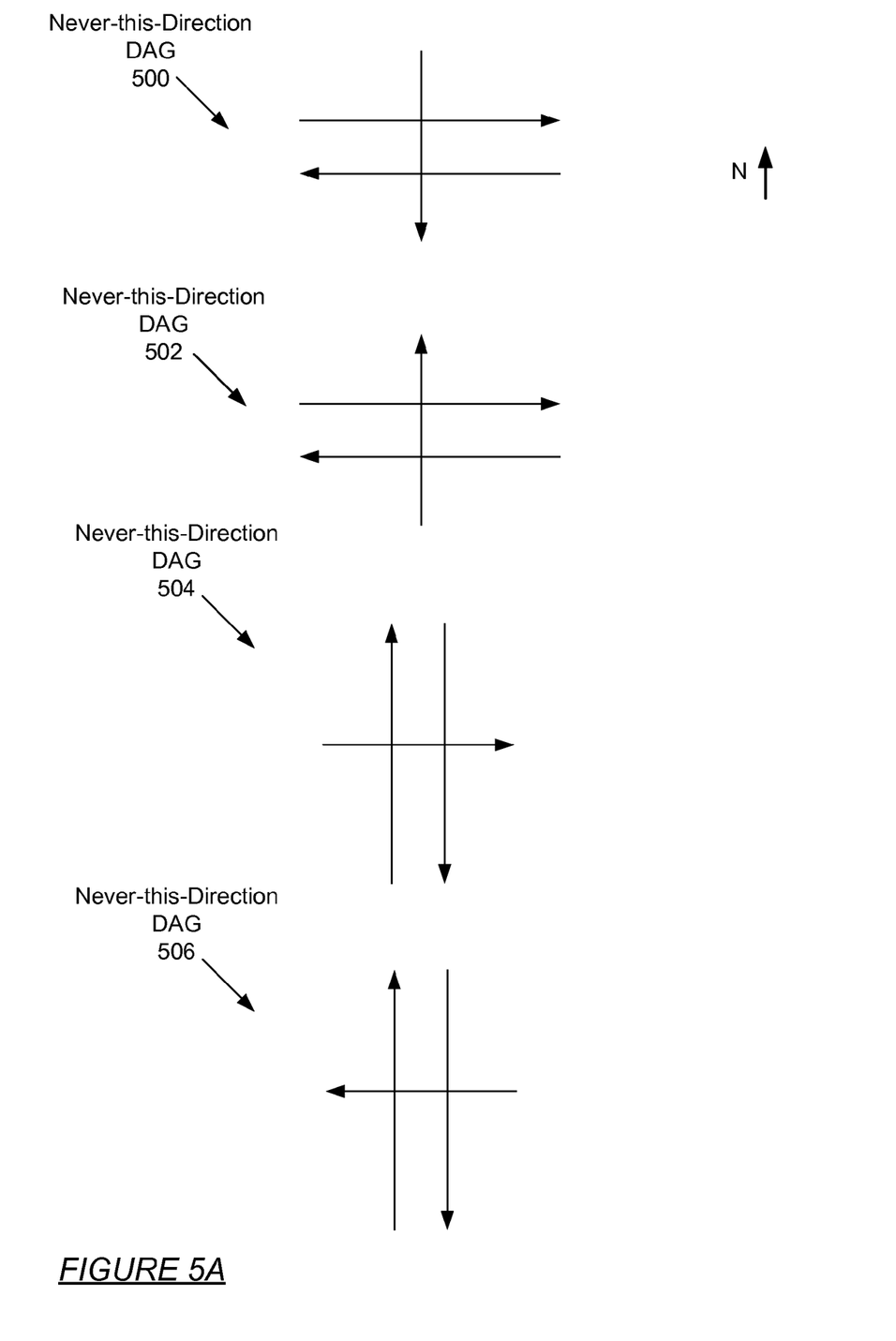
FIGS. 5A and 5B show never this direction DAGs and a combination of the never-this-direction DAGs to form a switching fabric in accordance with one embodiment of the invention.

FIG. 5A shows four independent never-this-direction DAGs (i.e., 500, 502, 504, 506) in accordance with one embodiment of the invention. In particular, never-this direction DAG (500) employs a not-north policy, never-this direction DAG (502) employs a not-south policy, never-this direction DAG (504) employs a not-west policy, and never-this direction DAG (506) employs a not-east policy. As mentioned above, when designing the switching network for each IC (or a group of ICs) in a system, each switching network is mapped onto a 2D DAG grid. In the case shown in FIG. 5A, consider the scenario in which a combination of the four independent never-this-direction DAGs (500, 502, 504, 506) is used to map the switching fabric associated with an IC onto a DAG network. In such a scenario, combining the independent never-this-direction DAGs allows "full connectivity" for a particular device. Those skilled in the art will appreciate that "full connectivity" may also be achieved by combining two or more never-this-direction DAGs. In one embodiment of the invention, combining four never-this-direction DAGs provides a more symmetric and balanced switching fabric with redundant paths between any two points in the network.

Figure 5B:
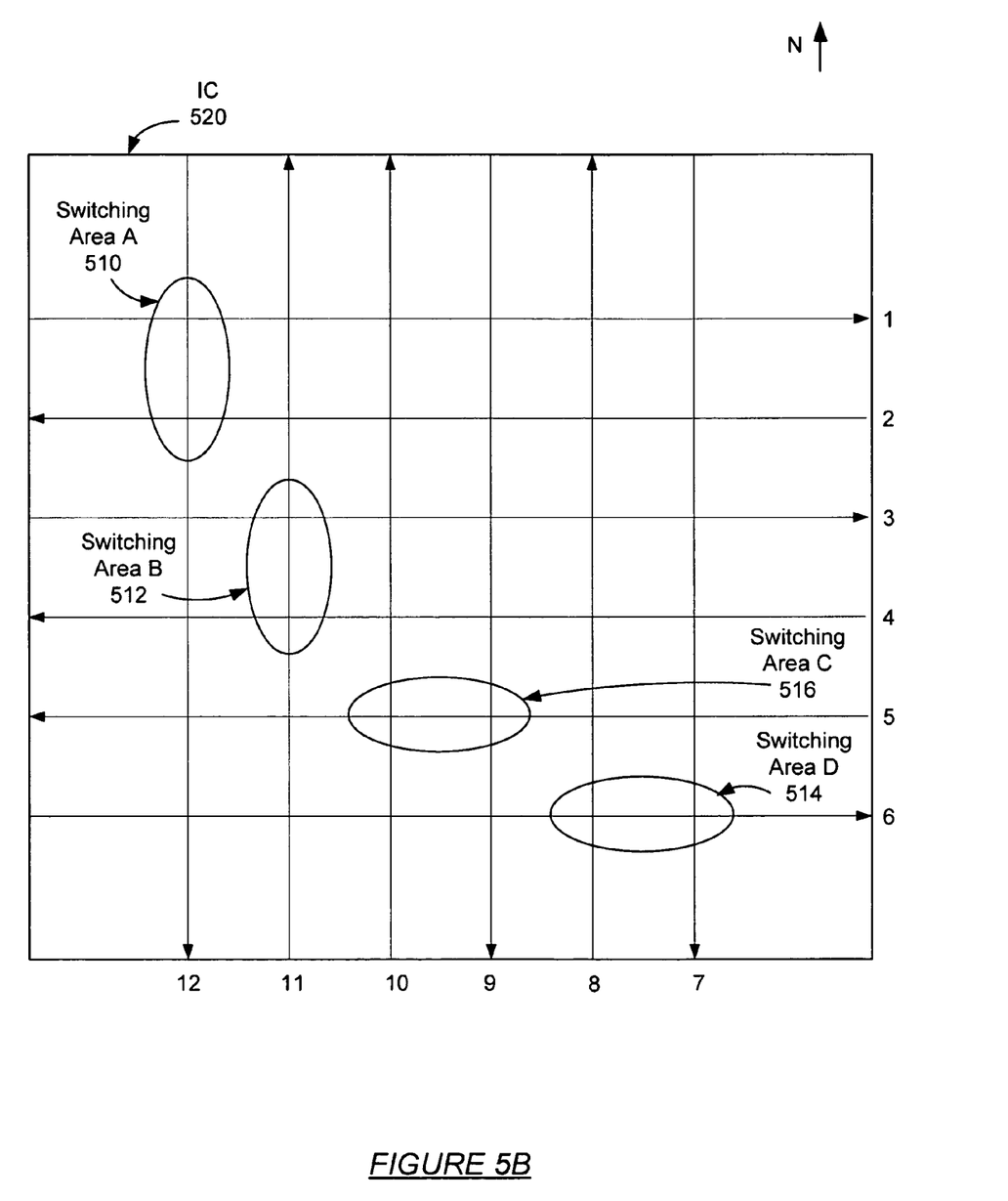

FIG. 5B shows an example of combining never-this-direction DAGs in an IC (520) to provide switching capabilities within the IC (520) in accordance with one embodiment of the invention. Specifically, FIG. 5B combines the four independent never-this-direction DAG networks of FIG. 5A on one IC (520). In FIG. 5B, lines 1, 2, and 12 is a not-north never-this-direction DAG (i.e., 500 in FIG. 5A), and lines 3, 4, and 11 make up a not-south never-this-direction DAG (i.e., 502 in FIG. 5A). Similarly, lines 5, 9, and 10 represent a not-east never-this-direction DAG (i.e., 506 in FIG. 5A), and lines 6, 7, and 8 represent a not-west never-this-direction DAG (i.e., 504 in FIG. 5A). Further, each switching area (i.e., Switching Area A (510), Switching Area B (512), Switching Area C (516), Switching Area D (514)) covers the area in which turns are possible in a particular never-this-direction DAG.

In one embodiment of the invention, the switching fabric of FIG. 5B may be duplicated on all the interconnected ICs in the system. For example, the switching fabric shown in FIG.

5B may be duplicated on all the ICs interconnected in FIG. 2. In this case, all the outputs of the switching fabric correspond to inputs of the adjacent switching fabric associated with an interconnected IC (i.e., the outputs of the switching fabric correspond to inputs of the neighbor switching fabric). Thus, a fully connected switch is constructed from a collection of simple switching ICs with the initial bandwidth distributed in 6 times w/6 unidirectional lines belonging to four completely independent DAGs. In one embodiment of the invention, when one switching fabric is symmetrically duplicated in this manner, all the connections of each switching fabric follow the DAG construction. That is, not-north never-this-direction DAGs connect to other not-north never-this direction DAGs, not-east never-this-direction DAGs connect to other not-east never-this-direction DAGs, etc. Those skilled in the art will appreciate that for each switch constructed in this manner, all the DAGs are of the same type (i.e., never-this-direction DAGs, quadrant DAGs, etc.).

Using FIG. 5B, a specific one of the several DAG networks that make up the switching fabric within the IC (520) may be chosen to route data, depending on which direction the data needs to be routed to reach a desired destination. For example, if data enters on line 2, then data may be routed south on line 12, or data may continue westbound to another IC. Thus, if the destination of data is located in a south or west direction, then the not-north DAG network represented by switching area A (510) may be chosen. Alternatively, if the destination of data entering the switching fabric of FIG. 5B is located north, then the data may enter using line 3 and be routed northbound on line 11 via switching area B (512).

Those skilled in the art will appreciate that the switching fabric of FIG. 5B may be combined with other switching devices to form larger switching fabrics that are associated with multiple devices of a system. Further, those skilled in the art will appreciate that quadrant DAGs or any other type of DAG may also be combined to form a "fully connected" switching fabric as shown in FIG. 5B.

Figure 6:
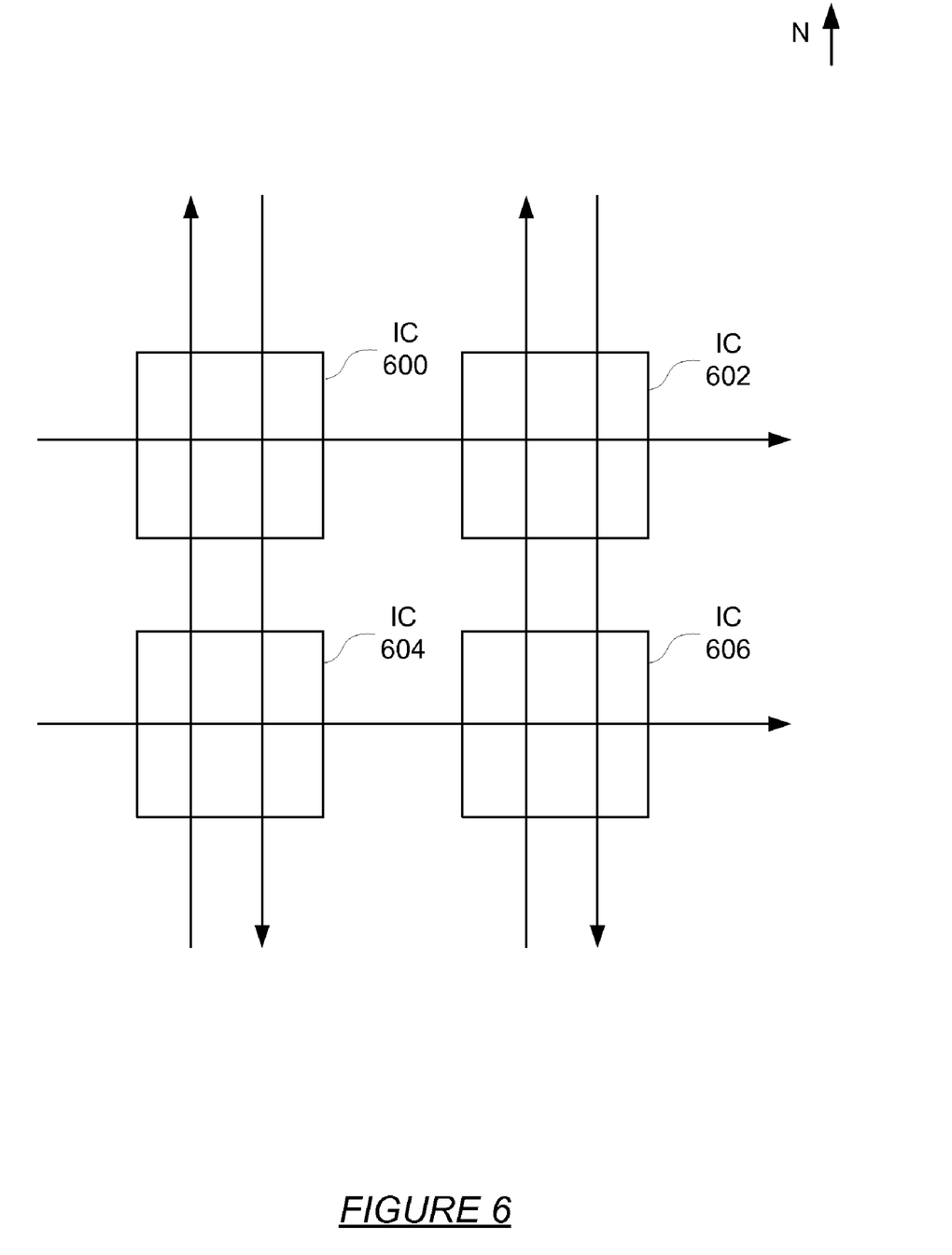
FIG. 6 shows interconnected integrated circuits in accordance with one embodiment of the invention.

FIG. 6 shows an example of interconnected integrated circuits (ICs) (i.e., 600, 602, 604, 606) in accordance with one embodiment of the invention. More specifically, FIG. 6 shows four ICs (i.e., 600, 602, 604, 606) mapped onto a never-this-direction DAG that are interconnected in a switching fabric. For example, the ICs shown in FIG. 6 may be four of the ICs positioned side by side in FIG. 2. In one embodiment of the invention, the ICs (i.e., 600, 602, 604, 606) are interconnected via proximity communication. Those skilled in the art will appreciate that ICs may also be interconnected using other methods of connection, e.g., electrical wires connected across a bus, etc. The never-this-direction DAG shown in FIG. 6 is a not-west never-this-direction DAG, as indicated by the lack of an arrow in the west direction. Using FIG. 6, data entering IC (600) may be routed eastward to IC (602), southbound to IC (604) or south and then east to IC (606). If ICs (602, 604, or 606) are not the destination for the data, then data may exit one of the ICs (602, 604, or 606) onto another DAG sub-graph that allows the data to be routed to a final destination. Similarly, data entering IC (606) can continue north to IC (602) or exist one of IC (602) or IC (606) and continue on a not-west DAG sub-graph to a final destination.

As noted above, a group of ICs interconnected as shown in FIG. 6 above form a module. Those skilled in the art will appreciate that module-to-module interconnection is also performed using DAG network properties, so that the deadlock-free property is extended to the construction of the entire system.

The DAG deadlock-free property is inherently present when multiple never-this-direction DAGs are combined (e.g., as in FIG. 6) due to the following conditions: (1) data is not permitted to loopback from the east direction using the west direction; and (2) if an attempt is made to loopback from north to south or from south to north, data must be routed eastbound for one hop, where the first condition applies, such that loopback on the same DAG network is impossible.

Figure 7:
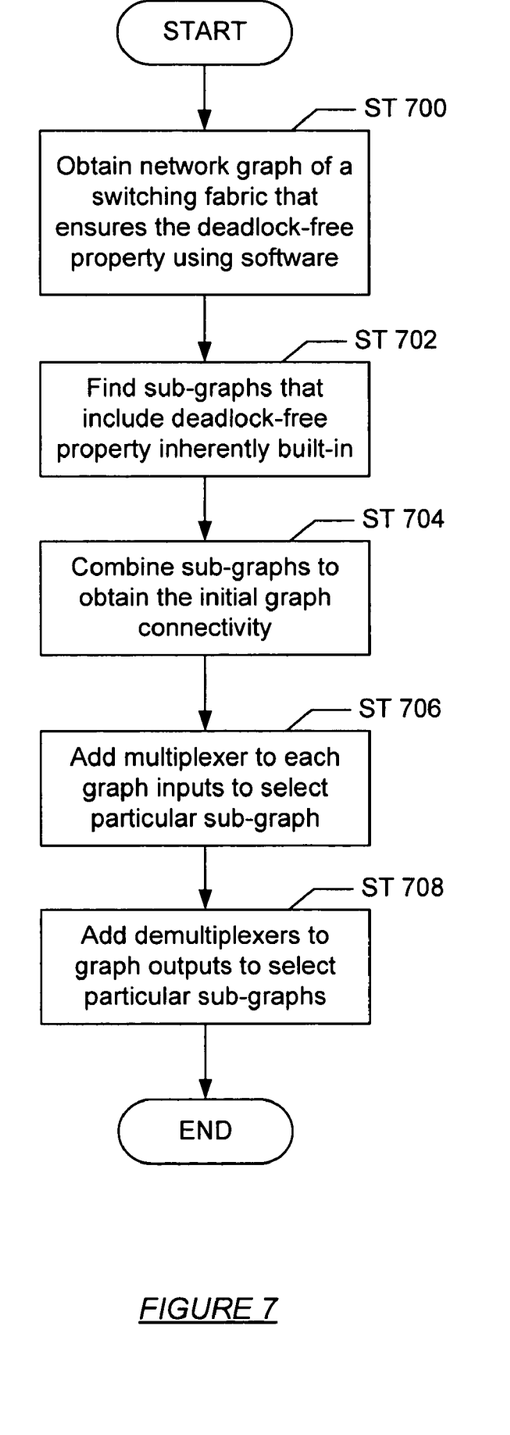
FIG. 7 shows a flow chart for designing a switching fabric in accordance with one embodiment of the invention.

FIG. 7 shows a flow chart for constructing a switching fabric network in accordance with one embodiment of the invention. Initially, the network graph of a switching fabric that ensures the deadlock-free property using software is obtained (Step 700). Said another way, the network graph of an existing switching fabric that implements the deadlock-free property via software is obtained. Subsequently, the sub-graphs (i.e., the individual networks within the switching fabric) that include deadlock-free property inherently built-in are determined (Step 702). In other words, the DAG sub-graphs within the switching fabric are determined. In one embodiment of the invention, the sub-graphs correspond to output ports to exit sources and to input ports to input destinations of one or more integrated circuits in the system. Those skilled in the art will appreciate that Step 702 may be performed using graph theory well known in the art. Upon finding the sub-graphs that include the deadlock-free property built into the logical design of the sub-graph, the sub-graphs are combined to obtain the initial connections between sources and destinations in the switching fabric (Step 704). At this stage, a multiplexer is added to each graph input, which allows the selection of a particular DAG sub-graph from each input of the switching fabric (Step 706). Finally, demultiplexers are added to graph outputs, which allow the selection of particular sub-graphs from each output of the switching fabric (Step 708). Those skilled in the art will appreciate that multiplexers and demultiplexers are added to the switching fabric when devices are connected to the switching fabric because the devices may need to access a location within the switching fabric from any direction.

Figure 8:
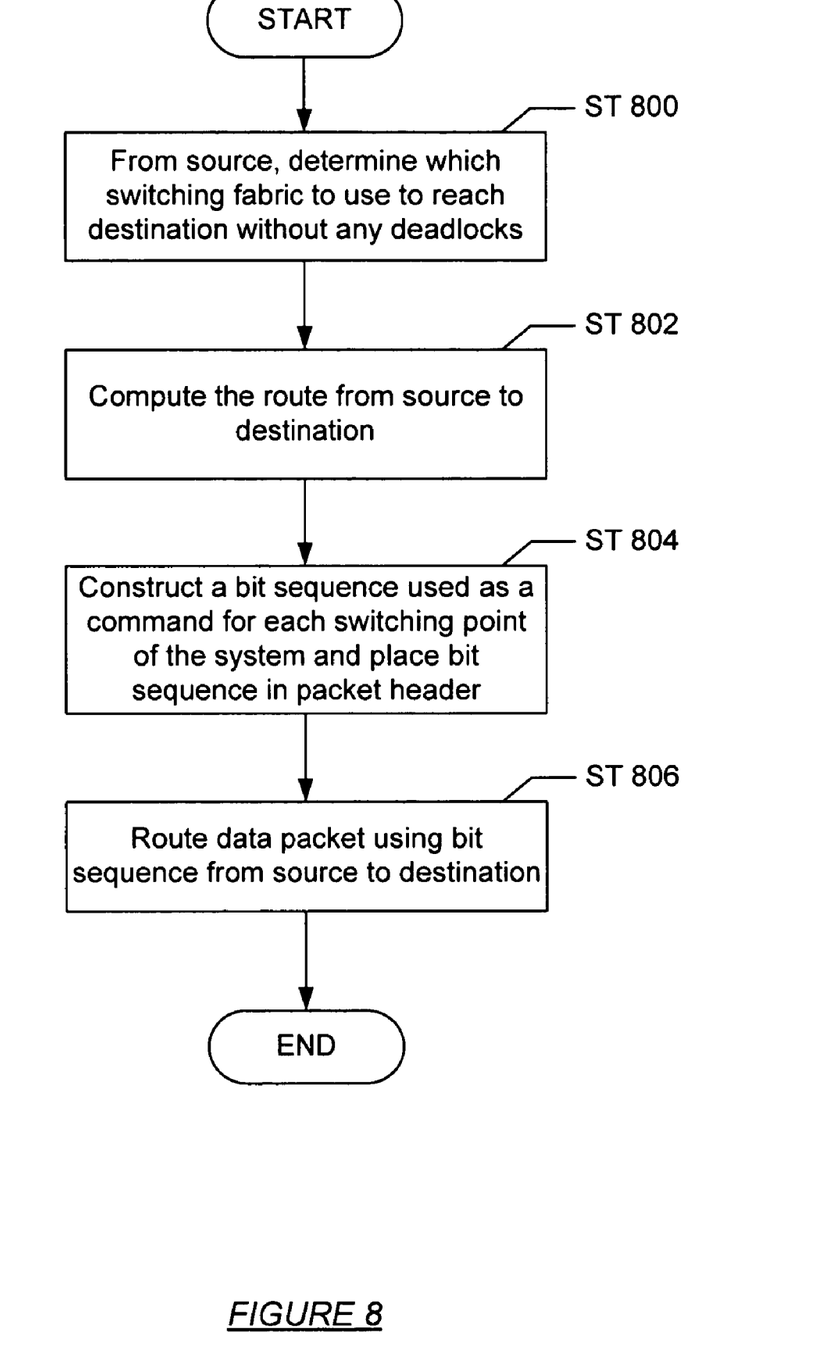
FIG. 8 shows a flow chart for routing data using a switching fabric in accordance with one embodiment of the invention.

FIG. 8 shows a flow chart for routing data using a switching fabric constructed with a collection of DAG networks in accordance with one embodiment of the invention. In one embodiment of the invention, the process of FIG. 8 performs all the switching decisions at the source, and places the instructions for routing of data in the header of the data stream so that each switch encountered from the source to the destination simply decodes the header bits that dictate where the data should be routed. However, those skilled in the art will appreciate that data may also be routed such that the switches make decisions about where to route the data on-the-fly. Alternatively, the command for routing data may also be external or dynamic as long as the initial multiplexing choice performed to choose the appropriate DAG network is correct.

Initially, from a particular source, a DAG network is selected that allows the data to reach a particular destination without encountering any deadlocks (Step 800). In other words, a specific DAG sub-graph in the switching fabric that connects the source to the desired destination is selected. For example, if the switching fabric is constructed using never-this-direction DAG networks, then particular turns are not possible at each switching area. Thus, the correct switching network needs to be selected from the source such that the turns necessary to reach the desired destination are permitted. Next, the route (i.e., the switching commands) from a source to a destination is computed for the given switching fabric (Step 802). Subsequently, a bit sequence is constructed to be used as a command for each switching point in the switching fabric (Step 804). In one embodiment of the invention, the bit sequence is placed in the headers of the packets being routed.

Upon constructing a bit sequence used as a command, the data is routed from the source to the destination using the bit sequence (Step 806).

In one embodiment of the invention, the bit sequence may use two bits per command. For example, the bit sequence 00 may indicate that data is to be routed straight through the chip and onto the next chip. Thus, the bit sequence 00 may control at least two or as many as three switches, depending on the design of the switching fabric. Similarly, the bit sequence 01 may indicate a left turn, in which case only the first switch encountered may be controlled with this bit sequence. The bit sequence 10 may represent "this chip," indicating that the payload of the data is to be delivered to the memory of the current chip, in which case up to five switches may be controlled using this one two bit sequence. The last combination, 11, may be used to signify the end of the word. As bits of the bit sequence are consumed, whether consumption is based on data exiting the current chip or deliverance of the payload to memory, the bits may be shifted so that further commands are available for the next switch encountered in the switching fabric.

Those skilled in the art will appreciate that several other encoding schemes may exist for use to route data in a deadlock-free switching fabric. There may any arbitrary number of bits per switch. For example, data may be routed with the following encoding scheme: 00=North, 01=East, 10=South, 11=West. Alternatively, data may be routed using one-bit encoding schemes, where 0 indicates that data is to be routed straight, and 1 indicates that data is to turn. Further, the routing command may be inside the header of the packet, external to the packet, or a combination of both.

Figure 9:
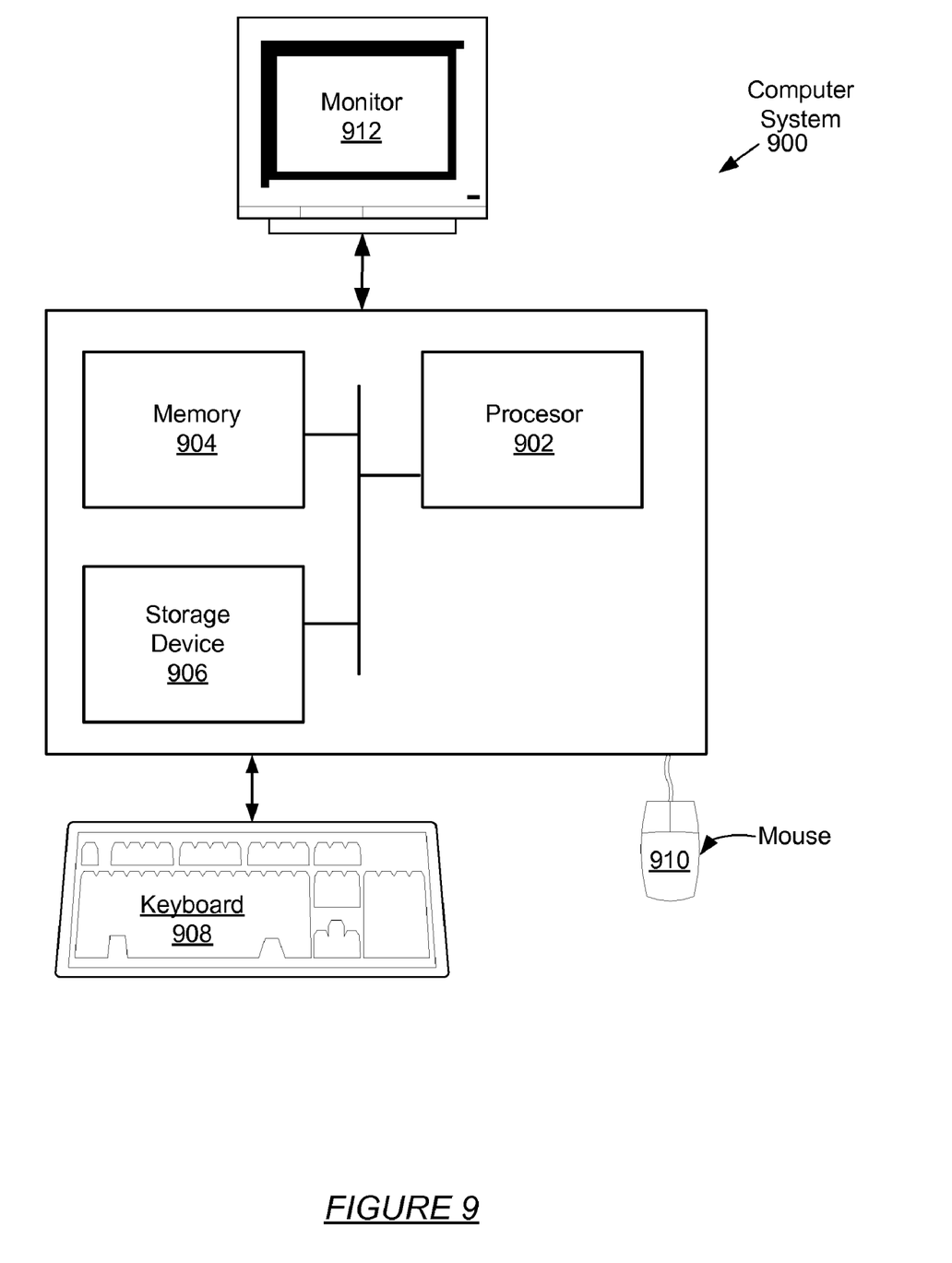
FIG. 9 shows a computer system in accordance with one embodiment of the invention.

One or more embodiments of the invention may be implemented on virtually any type of computer regardless of the platform being used. For example, as shown in FIG. 9, a networked computer system (900) includes a processor (902), associated memory (904), a storage device (906), and numerous other elements and functionalities typical of today's computers (not shown). The networked computer (900) may also include input means, such as a keyboard (908) and a mouse (910), and output means, such as a monitor (912). The networked computer system (900) is connected to a local area network (LAN) or a wide area network via a network interface connection (not shown). Those skilled in the art will appreciate that these input and output means may take other forms. Further, those skilled in the art will appreciate that one or more elements of the aforementioned computer (900) may be located at a remote location and connected to the other elements over a network. Further, software instructions to perform embodiments of the invention may be stored on a computer readable medium such as a compact disc (CD), a diskette, a tape, a file, or any other computer readable storage device.

Embodiments of the invention provide a method for constructing switching fabrics with an inherent deadlock-free property built into the network. By reducing the width of the network lines, some space is traded to produce multiple independent networks that avoid deadlock. This avoids the burden on switching algorithms to avoid deadlock when routing data. Thus, simple switching algorithms can be used to route data. Further, in a well-balanced, symmetric network, overall bandwidth is not affected because of the sum of the smaller, multiple independent network lines equals the bandwidth of the original network line.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
   at least one central processing unit;
   at least one memory unit; and
   a plurality of integrated circuits that form a switching fabric configured to route data packets between the at least one central processing unit and the at least one memory unit,
   wherein the switching fabric is constructed using at least two directed acyclic graph (DAG) networks,
   wherein the at least two DAG networks comprise one selected from a group consisting of a quadrant-DAG and a never-this-direction DAG, and
   wherein the never-this-direction DAG comprises one selected from the group consisting of a not-south DAG, a not-east DAG, a not-west DAG, and a not-north DAG.

2. The system of claim 1, wherein the at least two DAG networks are used to map at least one source to at least one destination of the switching fabric.

3. The system of claim 1, wherein each one of the at least two DAG networks comprises a deadlock-free property, and wherein the switching fabric is deadlock-free.

4. The system of claim 1, wherein the quadrant-DAG comprises one selected from the group consisting of a north-east DAG, north-west DAG, south-east DAG, and a south-west DAG.

5. The system of claim 1, wherein the switching fabric is used to route data using a bit sequence encoding scheme.

6. The system of claim 1, wherein a multiplexer is added to each input in the at least two DAG networks, and a demultiplexer is added to each output of the at least two DAG networks.

7. The system of claim 6, wherein the multiplexer and the demultiplexer allow the selection of one of the at least two DAG networks.

8. The system of claim 1, wherein each of the plurality of ICs are mapped onto at least one DAG network.

9. The system of claim 8, wherein each of the plurality of ICs are interconnected, and wherein DAG networks associated with each of the plurality of ICs are connected to each other to obtain the switching fabric.

10. A method for constructing a switching fabric, comprising:
    obtaining at least two sub-graphs comprising a deadlock-free property in an existing switching fabric, wherein the at least two sub-graphs are directed acyclic graphs (DAGs);
    combining the at least two sub-graphs to obtain an initially connected switching fabric;
    adding a multiplexer to each input of the initially connected switching fabric, wherein the multiplexer allows the selection of one of the at least two sub-graphs;
    adding a demultiplexer to each output of the initially connected switching fabric to obtain a fully-connected switching fabric, wherein the demultiplexer allows the selection of one of the at least two sub-graphs, and wherein the fully-connected switching fabric is configured to route data packets from a source to a destination, and
    wherein the fully-connected switching fabric comprises the deadlock-free property,
    wherein the at least two sub-graphs comprise one selected from the group consisting of a quadrant-DAG and a never-this-direction DAG, and wherein the never-this-direction DAG comprises one selected from the group consisting of a not-south DAG, a not-east DAG, a not-west DAG, and a not-north DAG.

11. The method of claim 10, further comprising:
selecting one of the at least two sub-graphs to obtain a selected sub-graph; and
routing data through the selected sub-graph from a source to a destination without deadlocks.

12. The method of claim 11, wherein the data is routed using a bit sequence encoding scheme.

13. The method of claim 10, wherein the at least two sub-graphs are symmetrical.

14. The method of claim 10, wherein the quadrant-DAG comprises one selected from the group consisting of a north-east DAG, north-west DAG, south-east DAG, and a south-west DAG.

15. A computer readable medium for constructing a switching fabric comprising software instructions executable by a processor to:
obtain at least two sub-graphs comprising a deadlock-free property in an existing switching fabric, wherein the at least two sub-graphs are directed acyclic graphs (DAGs);
combine the at least two sub-graphs to obtain an initially connected switching fabric;
add a multiplexer to each input of the initially connected switching fabric, wherein the multiplexer allows the selection of one of the at least two sub-graphs; and
add a demultiplexer to each output of the initially connected switching fabric to obtain a fully-connected switching fabric, wherein the demultiplexer allows the selection of one of the at least two sub-graphs, and
wherein the fully-connected switching fabric comprises the deadlock-free property,
wherein the at least two DAG networks is one selected from the group consisting of a quadrant-DAG and a never-this-direction DAG, and
wherein the never-this-direction DAG comprises one selected from the group consisting of a not-south DAG, a not-east DAG, a not-west DAG, and a not-north DAG.

* * * * *